(12) United States Patent
Nevalainen (10) Patent No.: US 8,892,643 B2
(45) Date of Patent: Nov. 18, 2014

(54) METHOD AND DEVICE FOR DETERMINING AND NOTIFYING USERS HAVING MATCHING PREFERENCE PROFILES FOR ACCESSING A MULTIPLE ACCESS ONLINE APPLICATION

(75) Inventor: Mikko Nevalainen, Lempäälä (FI)

(73) Assignee: Nokia Corporation, Espoo (FI)

( * ) Notice: Subject to any disclaimer, the term of this patent is extended or adjusted under 35 U.S.C. 154(b) by 541 days.

(21) Appl. No.: 10/561,642

(22) PCT Filed: Jun. 30, 2003

(86) PCT No.: PCT/IB03/02531
§ 371 (c)(1),
(2), (4) Date: Apr. 4, 2006

(87) PCT Pub. No.: WO2005/002265
PCT Pub. Date: Jan. 6, 2005

(65) Prior Publication Data
US 2006/0242291 A1     Oct. 26, 2006

(51) Int. Cl.
*G06F 15/16*   (2006.01)
*H04L 29/08*   (2006.01)
*H04W 4/08*    (2009.01)
*H04W 8/18*    (2009.01)
*H04W 8/24*    (2009.01)

(52) U.S. Cl.
CPC .............. *H04W 4/08* (2013.01); *H04L 67/04* (2013.01); *H04W 8/18* (2013.01); *H04W 8/245* (2013.01); *H04L 67/306* (2013.01); *H04W 8/186* (2013.01)
USPC ........................................... 709/204

(58) Field of Classification Search
CPC ....... H04L 67/04; H04L 67/306; H04W 4/08; H04W 8/186
USPC .................. 709/203, 204, 223, 224, 227, 228
See application file for complete search history.

(56) References Cited

U.S. PATENT DOCUMENTS 4,572,509 A * 2/1986 Sitrick ............................ 463/31
4,856,787 A * 8/1989 Itkis ............................. 273/237
(Continued)

FOREIGN PATENT DOCUMENTS

WO    WO 01/26408 A1    4/2001
WO    WO 01/86997 A1    11/2001

OTHER PUBLICATIONS

Demers et al. The Bayou Architecture: Support for Data Sharing among Mobile Users. IEEE. 1995. pp. 2-7 (1-6).*

(Continued)

*Primary Examiner* — Imad Hussain
(74) *Attorney, Agent, or Firm* — Ditthavong & Steiner, P.C.

(57) ABSTRACT

Method and device for starting a multiple access to a multiple access online application such as an online game. The method enables a plurality of mobile terminal devices each being connected to a wireless communication network and each being related to a user, to participate multiple access online application. The devices in said wireless communication network are configured to perform transferring identification data and preference data related to each of said users, from at least one of said mobile terminals to a server. The method proceeds with, storing said identification data and said received preference data in a user database at a server, wherein said user database containing preference data of at least one other user. The method further compares said received preference data with preference data of said at least one other user for groups of matching preference data, and determining a plurality of users having matching preference data. The method further comprises sending a notification to each of said users with matching preference data.

13 Claims, 2 Drawing Sheets

(56) References Cited

U.S. PATENT DOCUMENTS

| | | | |
|---|---|---|---|
| 5,083,800 A * | 1/1992 | Lockton | 463/42 |
| 5,086,394 A * | 2/1992 | Shapira | 705/319 |
| 5,114,155 A * | 5/1992 | Tillery et al. | 273/371 |
| 5,359,510 A * | 10/1994 | Sabaliauskas | 700/91 |
| 5,558,339 A * | 9/1996 | Perlman | 463/42 |
| 5,580,309 A * | 12/1996 | Piechowiak et al. | 463/16 |
| 5,586,257 A * | 12/1996 | Perlman | 463/42 |
| 5,593,349 A * | 1/1997 | Miguel et al. | 463/30 |
| 5,630,159 A * | 5/1997 | Zancho | 709/221 |
| 5,815,665 A * | 9/1998 | Teper et al. | 709/229 |
| 5,823,879 A * | 10/1998 | Goldberg et al. | 463/42 |
| 5,828,843 A * | 10/1998 | Grimm et al. | 709/228 |
| 5,894,556 A * | 4/1999 | Grimm et al. | 709/227 |
| 6,001,016 A * | 12/1999 | Walker et al. | 463/42 |
| 6,052,122 A * | 4/2000 | Sutcliffe et al. | 715/751 |
| 6,128,660 A * | 10/2000 | Grimm et al. | 709/227 |
| 6,152,824 A * | 11/2000 | Rothschild et al. | 463/42 |
| 6,249,282 B1 * | 6/2001 | Sutcliffe et al. | 715/751 |
| 6,272,467 B1 * | 8/2001 | Durand et al. | 705/5 |
| 6,322,451 B1 * | 11/2001 | Miura | 463/42 |
| 6,524,189 B1 * | 2/2003 | Rautila | 463/40 |
| 6,542,515 B1 * | 4/2003 | Kumar et al. | 370/463 |
| 6,549,768 B1 * | 4/2003 | Fraccaroli | 455/456.3 |
| 6,648,760 B1 * | 11/2003 | Nicastro | 463/23 |
| 6,651,086 B1 * | 11/2003 | Manber et al. | 709/205 |
| 6,757,517 B2 * | 6/2004 | Chang | 455/3.05 |
| 6,801,962 B2 * | 10/2004 | Taniguchi et al. | 710/33 |
| 6,847,963 B1 * | 1/2005 | Paclat | 1/1 |
| 6,932,708 B2 * | 8/2005 | Yamashita et al. | 463/42 |
| 7,039,672 B2 * | 5/2006 | Wu et al. | 709/201 |
| 7,076,504 B1 * | 7/2006 | Handel et al. | 705/14.39 |
| 7,113,975 B2 * | 9/2006 | Nakayama et al. | 709/204 |
| 7,134,961 B2 * | 11/2006 | Hora | 463/42 |
| 7,177,915 B2 * | 2/2007 | Kopchik | 709/217 |
| 7,249,182 B1 * | 7/2007 | Heinonen et al. | 709/227 |
| 7,270,605 B2 * | 9/2007 | Russell et al. | 463/40 |
| 7,272,385 B2 * | 9/2007 | Mirouze et al. | 455/414.1 |
| 7,280,822 B2 * | 10/2007 | Fraccaroli | 455/414.3 |
| 7,284,033 B2 * | 10/2007 | Jhanji | 709/206 |
| 7,310,733 B1 * | 12/2007 | Pearson et al. | 713/185 |
| 7,876,215 B1 * | 1/2011 | Brady, Jr. | 340/539.11 |
| 2002/0013869 A1 * | 1/2002 | Taniguchi et al. | 710/33 |
| 2002/0059387 A1 * | 5/2002 | Wolfe | 709/206 |
| 2002/0061743 A1 * | 5/2002 | Hutcheson et al. | 455/426 |
| 2002/0091833 A1 * | 7/2002 | Grimm et al. | 709/227 |
| 2002/0096831 A1 * | 7/2002 | Nakayama et al. | 273/430 |
| 2002/0178216 A1 * | 11/2002 | Walther et al. | 709/203 |
| 2002/0194049 A1 * | 12/2002 | Boyd | 705/9 |
| 2003/0007464 A1 * | 1/2003 | Balani | 370/310 |
| 2003/0067908 A1 * | 4/2003 | Mattaway et al. | 370/352 |
| 2003/0126121 A1 * | 7/2003 | Khan et al. | 707/3 |
| 2004/0215756 A1 * | 10/2004 | VanAntwerp et al. | 709/223 |
| 2005/0021750 A1 * | 1/2005 | Abrams | 709/225 |
| 2005/0277472 A1 * | 12/2005 | Gillan et al. | 463/42 |
| 2006/0242291 A1 * | 10/2006 | Nevalainen | 709/224 |

OTHER PUBLICATIONS

Cheng. Service Advertisement and Discovery in Mobile Ad hoc Networks. 2002. pp. 1-4.*

European Office Action of corresponding European Patent Application No. 03738382.5-2412 dated Feb. 4, 2010, pp. 1-10.

* cited by examiner

METHOD AND DEVICE FOR DETERMINING AND NOTIFYING USERS HAVING MATCHING PREFERENCE PROFILES FOR ACCESSING A MULTIPLE ACCESS ONLINE APPLICATION

The present invention relates to an online access to a multiple access online application. More specifically the present invention relates to a method and a device for determining and notifying users having substantially matching preference profiles for accessing a multiple access online application. The invention also relates to the problem of bringing together the participants of a multiple access online application in case of a wireless communication network online game.

The participants in multiple access online applications such as online games usually do not know each other. The problem to solve is to provide a possibility to connect the users that like to participate in an online game on the basis of similar or substantially similar or matching preferences.

Procedures to perform different multiple access online applications are provided by the example of online games in EP 1 066 867 and EP 1 066 868. The document EP 1 066 867 describes generally the procedures necessary to perform such an online game. The document EP 1 066 868 discloses procedures necessary to perform such an online game with using a low power radio link between the single user devices. None of the documents discloses a procedure on how a number of players can be acquired to simultaneously start a game round. The document EP 1 066 868 discloses one approach by which a user can leave and/or join a running game.

Both documents fail to disclose a way in which a number of people not knowing each other and therefore not able to arrange a game by themselves can start an online game.

It is therefore desirable to have a possibility to join users that like to participate in an online game on the basis of similar or substantially matching preferences.

It is further desirable to provide a possibility for users to find an online game partner having substantially matching preferences and the same gaming strength.

According to a first aspect of the present invention, there is provided a method for determining and notifying users having a matching preference profile, for accessing a multiple access online application in a wireless communication network. The multiple access online application is destined for a plurality of mobile terminal devices each being connected to a wireless communication network and being related to said users. The method comprises receiving, saving comparing of preference data and determining substantially matching preference data and notifying the users which have been determined to have substantially matching preference profiles.

By receiving said preference profile including identification (ID) data and preference data related to at least one of said users, from at least one of said mobile terminals, a database can be put up. The ID data and said preference data can be transferred simultaneously or subsequently within a one step or a multi-step data exchange. The use of the ID data should be basically clear, e.g. to prevent the occurrence of "double personalities", i.e. that a user is provided with a double set of entries in the data database, and to prevent that the server suggests a user to play against himself. The preference data can be (in regard to multiplayer online game applications) e.g. the game itself, the gaming strength, preferred virtual characters in role-play games or preferred virtual persons or teams (or clubs).

It may be noted that in the following the expression 'server' is used to denote a server device and a server functionality, wherein said functionality may also be provided by in a terminal device, so the server may be actually a terminal device related to a user.

These received ID data and said received preference data are subsequently saved in a user database, for further access, wherein the user database contains preference data of at least one other user. The higher the number of database entries the more probable the next received player and his set of preferences will find a matching game partner. The data can be stored for a longer period of time or may be deleted after a group of players has been set up.

By comparing received and stored preference data with the preference data of said at least one other user a plurality of users having substantially matching preference data will be determined. In case of a game this is necessary to assure that the following game round will not be terminated too fast or prematurely by a single superior player. The preference data can e.g. comprise a preferred game time as e.g. each Saturday from 8 to 10 P.M. It is also possible to evaluate the similarity of slightly differing preferences, to enable the start of a game even in case of not totally matching preferences. The degree of matching may also defined by a user within the preference data.

Stored preference data may also be used to determine the best period of time (a preferred time of the day or the week) to perform an online game competition, as it is easily possible to use the stored data to determine the period with the probably highest number of willingly participating gamers. The preference data can also be related to the preferred game version or a preferred game level. The preference data can also be related to the preferred number of game partners for multi-player games.

The expression 'matching' has been selected to describe that the users of said online application should have substantially matching interests, and thus all users can benefit from a matching multi-user access. By "substantially matching" a certain degree of non-matching is encompassed which is tolerable however. The server searches for groups of participants or users of at least two players having matching or similar preference profiles. It may be noted that matching preference profiles may not be identical, as it is unlikely that exactly matching preference profiles can be found in a restricted number of potential participants. Additionally, it is likely that a competition with players having identical game strengths may end up in a tie.

The number of online players required for a game may differ from two, as in the case of team sport games, which may comprise two different teams and may even employ a "referee" player. In case of soccer, the preference profile may also include a preferred position in the game such as goalkeeper, defensive, forward or e.g. 'referee'. In case of an online game this may represented by matching game strengths. In the case of intellectual games such as simulations it may be necessary that the players complement each other. Especially in games with a non-symmetrical structure it maybe necessary to bring together preference profiles that are not identical. In case of different game intentions, a player with relatively low tactics and low skill may compete with a skilled player that want to play e.g. a handicap competition.

The preference data may also comprise only categories such as race, land race, motor race, track race, etc. In this case two preference profiles 'race' and 'motorbike race' a matching may be found for a motorbike race. The preference profile categories can comprise sport games, racing games, social games, intellectual games, action games, etc.

It may be noted that the present invention is not to be restricted to the above examples of preference profile data. In case of a terminal based application or game the preference data may also comprise an identification of the game itself.

The search may be performed repeatedly or only in case of a new set of received identification and preference data.

If a number of matching sets of preference data have been determined, the server sends a notification to each of said mobile terminals having matching user preference data. The notification may be accompanied with advertisements such as e.g. proposals for future game session events, such as online competitions.

The multiple access online application can be a distributed or a centralized application i.e. the application can be running separately on different terminal devices or be centralized as a server device application. The multiple access online application can be an online game, as the prevailing circumstances of online games require at least two participants in the game and an online capability. If a user is able to contact the game server it may be expected that he or his terminal device fulfill all requirements to participate in the game. The multiple access online application can be any kind of online application that performs best with at least two users accessing an application that do not know each other.

The present invention proposes that users who want to participate in multi user online applications such as an online game enroll themselves at a server and declare and submit their preferences to said server, so that the server can, in case of enough or substantially matching preferences with one or more other players, send an invitation or a rendezvous address for starting said online application. If enough players take the invitation (or a respective challenge) the game can start.

The invention proposes that the potential participants of a multiple access online application such as an online game session shall send their intention to participate and desired type of application to a server and the server saves this information in a database. When another potential participant with the same interest is found the potential participants are informed e.g. by SMS and the application can be started by the participants or through the server.

In another example embodiment said method further comprises granting access to each of said notified mobile terminals to said multiple access online application by a server, if and when said multiple access online application is running on said server. This application is especially useful if the multiple access online application is running on the server itself, therefore the server can manage the access rights and the start of an application such as a game round automatically. In case of the online game application the server would start the game, select a virtual environment or may allocate different kind of virtual equipment to the players. It may be noted that especially in case of wireless communication networks a device can be connected to the network without being actually exchanging data with any devices also being connected to said network. Therefore, the ID data and the preference data may be transferred to the server via a messaging system even without a need for a permanent connection. The ID and preference data may be transferred via GPRS (general packet radio service), MMS (multi media messaging), via SMS (short message service), or any other suitable messaging system.

According to another aspect of the present invention a method for notifying a user having a matching preference profile with at least one other user, for accessing a multiple access online application destined for a plurality of mobile terminal devices each being connected to a wireless communication network and being related to users is provided. The mobile terminal device is related to a single user, wherein said mobile terminal device is connected to a wireless communication network. The method comprises sending a preference profile including identification (ID) data and preference data of said user to a server connected to said wireless communication network, via said network. The method further comprises receiving a notification from said server via said network, wherein said notification comprises an offer to get access to said multiple access online application according to said preference data. Said notification comprises data to enable an access of said mobile terminal device to said multiple access online application. This may be embodied e.g. as the deliverance of a network address (e.g. a telephone number) of a possible gaming partner. This may also be embodied e.g. as the deliverance of a game number and a server address in case of a server-based multiple access online application.

In yet another embodiment the method further comprises accessing said application according to said received data to enable an access to said multiple access online application. The elements of sending and receiving data and messages or notifications are only required for terminal devices that are connected to said wireless communication network. The accessing of said application in contrast requires a setting up of a direct connection to the device providing said multiple access online application.

It can be seen that the server side and the terminal side of the methods complement each other.

According to another aspect of the present invention, a method for starting or operating a multiple access to a multiple access online application of a plurality of mobile terminal devices each being connected to a wireless communication network by means of a mediation server is provided. The assembly of both parts, the server side and the terminal side of the method leads to a method for starting a multiple access to a multiple access online application of a plurality of mobile terminal devices each being related to a user and a server each being connected to a wireless communication network. The method is characterized in that said server performs the server side of the method as described in the preceding description and that the said terminal devices perform a terminal side method as described in the preceding description.

In other example embodiments of the above-described methods said wireless communication network is a cellular communication network. In other embodiments of the above-described methods said wireless communication network is a mobile cellular telephone network. This can be applied to the methods related to the server, related to the terminal and related to the system.

In yet other example embodiments of the above-described methods said notification is performed via a short message (SM) or via a multimedia message (MMS).

In other additional example embodiments of the methods said multiple access online application is a wireless communication network game. This embodiment may be denoted as a server-based player acquisition for cellular network games (CNG) in case of a cellular communication network.

There are two kinds of CNGs possible, in a first case the CNG is located at a server and in the second case the CNG is terminal based.

In the server-based version the CNG software is located and operated at and by a server. In this case the terminals act basically as a remote control for a game application running at the server. The terminals act like the controllers and the screen of a video game, the wireless communication network functions as the controller cable and the TV cable and the server acts as the video game console running the game application. In this scenario the players may change the settings of the game before it is started.

In the terminal based version the CNG software is located and operated at and by the terminals. The CNG software can be located e.g. in an MMC card inserted in the mobile terminal. The CNG software may be downloaded from a server to said terminal or to an MMC card inserted in said mobile terminal.

In the case of the terminal-based version of the CNG, the server may only act as a relay station forwarding the moves of the participating players between the terminals, wherein each of the terminals create their own scenario in a (basically independent) way.

In this case it is possible that the mediating server only has the function to induce the first contact between the players, and that the terminals connect each other directly via the wireless communication network, a cellular telephone network or even Bluetooth to start the game, bypassing the server.

Even in the case of a server-based implementation it is possible that the mediating server only has the function to induce the first contact between the players and e.g. a remote application or game server and that the terminals connect each other directly to a dedicated game server.

According to yet another aspect of the invention, a software tool is provided comprising program code means for carrying out the method of the preceding description when said program product is run on a computer or a network device.

According to another aspect of the present invention, a computer program product downloadable from a server for carrying out the method of the preceding description is provided, which comprises program code means for performing all of the steps of the preceding methods when said program is run on a computer or a network device.

According to yet another aspect of the invention, a computer program product is provided comprising program code means stored on a computer readable medium for carrying out the methods of the preceding description, when said program product is run on a computer or a network device.

According to another aspect of the present invention a computer data signal is provided. The computer data signal is embodied in a carrier wave and represents a program that makes the computer perform the steps of the method contained in the preceding description, when said computer program is run on a computer, or a network device.

According to yet another aspect of the present invention a network terminal device for notifying a user having a matching preference profile with at least one other user for accessing a multiple access online application is provided. The multiple access online application destined for a plurality of mobile terminal devices each being connected to a wireless communication network. The terminal device comprises an interface, an internal database and a processor. The interface is a wireless communication network interface for exchanging data with at least one server connected to said wireless communication network. The internal database is for storing ID data and preference data of a (or usually the only, but possibly more than one) user of said terminal device. The processor is connected to said interface and said database to process received, exchanged or stored data.

The terminal device is characterized in that said processor is configured to send a preference profile including ID data and preference data stored in said internal database via said network to a server. Said processor is further configured to receive a notification from said server comprising an offer to get access to said multiple access online application according to said sent data in said preferences profile. The received notification comprises data to enable an access of said mobile terminal device to said multiple access online application.

Said data to enable an access can include e.g. the number or the address of gamers or e.g. even proposals for coming game sessions.

Basically the terminal device is configured to execute the terminal side part of the communication between the server and the terminal for accessing a multiple access online application such as a CNG.

In another example embodiment of the present invention said processor is further configured to access a multiple access online application via a wireless communication network, in accordance with said received data to enable said access of said multiple access online application. This feature may be implemented by a processor that is configured to execute a script encapsulated in an MMS or (e.g. a WAP deck) to automatically connect to a game server or another gaming device with or without an explicit user confirmation.

In another example embodiment said network terminal device is provided with an interface for connecting an exchangeable memory device.

This exchangeable memory device may be implemented as an exchangeable MMC multi media card. The MMC may store a multi-user enabled online application software, a server address or an address of another gaming device with or without an explicit user confirmation. The MMC can also be used to store said preference profile.

According to yet another additional aspect of the present invention a network server for determining and notifying users having a matching preference profile is provided. Said preference profile is destined for accessing a multiple access online application destined for a plurality of mobile terminal devices each being connected to a wireless communication network and being related to said users. The network server comprises an interface, a user database and a processor. The interface is provided to connect the server to a wireless communication network for enabling the server to receive and send data to and from terminal devices connected to said wireless communication network. The user database is provided to store data i.e. user ID data and user preference data received from said terminal devices via said wireless communication network and said interface. The processor is connected to said interface and said database to process said received data and to send and receive data and notifications.

The interface is configured to receive at least one preference profile including ID data and preference data from at least one mobile terminal. The database is configured to store said data received via said interface in a user database. Further there is provided a component for comparing said received preference data with preference data of said at least one other user stored in said database for groups of matching preference data, and a component for determining a plurality of users having matching preference data. Further there is provided a component for sending a notification to each of said mobile phones having matching user preference data, if matching preference data have been found.

According to an additional aspect of the present invention a network system for enabling access of multiple network terminal devices to a multiple access online application via wireless communication network by means of a network server is provided. Said network system comprises network terminal devices being connected to said wireless communication network and a network server being connected to said wireless communication network. The network system according to the present invention is characterized in that said network terminal devices are terminal devices according to the preceding description and said network server is a network server is a network server according to the preceding description.

The term "matching" encompasses all kinds and degrees of similarity in the comparison between data and profiles. It specifically includes identical, similar and complementary profiles. The "complementary" encompasses all degrees and kinds of tolerable differences.

In the following, the invention will be described in detail by referring to the enclosed drawings in which.

Figure 1:
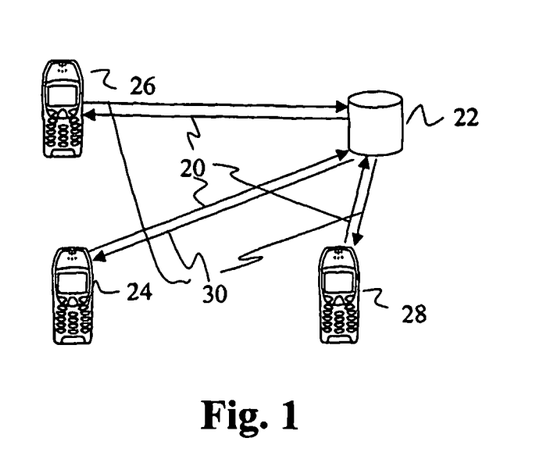
FIG. 1 shows the conventional star topology of terminal devices being connected to a server.

FIG. 1 shows a conventional star topology of terminal devices being connected to a server. The depicted star topology comprises a number of terminal devices 24, 26, 26 and a central server 22. According to the invention the single terminal devices 24, 26, 26 each enroll 20 themselves independently at the mediating server 22. In the description of the figures the server 22 is denoted as 'mediating server' to emphasize that the task of said server resides in bringing together different potential online application users. During the enrollment 20 the terminals each transfer usually subsequently an intention to play e.g. skat (a card game for tree participants). This game is chosen as an example as its software complexity is low and it may be played even on devices having relatively low processing power. The mediating server 22 sends a message to each of said terminal devices 24, 26, 26, when three players with approximately the same preferences have been found.

The mediating server 22 may also comprise a game-server functionality for the game of scat that may therefore be played via exchanged data between the server and the terminals. In the depicted case, the terminal devices 24, 26, 28 are represented by mobile telephones and the communication lines 20 30 are provided by e.g. the mobile telephone network and the game server 22 is a centralized mobile telephone network game server. In this case, the terminal devices represent the game controllers of a (scat) video game. The star topology is based on the idea that a single simulation is running in one place and the terminal devices exchange just the moves of the players and are not running a simulation itself. A single program running a single game server characterizes the star topology. The star topology corresponds to a hierarchical structure, wherein the server is the master and the terminal devices represent the slaves.

The presented usage case is related to a multi party game offered and arranged e.g. in a cellular telephone network. The actual game logic and an intelligent component is located in the server 22 which controls the game flow and ensures the data exchange 20 between different game partners 24, 26, 28. The server controls also the status of connection of the clients (mobile game users). If one client gets out of coverage or range (temporarily or permanently) the server can recognize it within a reasonable time period. This time period will of course depend on the type of the game. Turn-by-turn games like e.g. chess or scat can tolerate a longer period in comparison with fast shooting or jump and run games.

Another usage scenario deals with multi party games that are initiated by one mobile gaming partner using a wireless communication means for game data exchange purposes. The wireless means could be Bluetooth, GPRS (general packet radio service), UMTS (Universal Mobile Telephone Standard), Wireless LAN (Local Area Network), infra red and the like. No matter which connectivity means is used for such a gaming party, one of the game partner has to act as a server and control the data exchange between different partners. The gaming device acting, as server 22 for such game, will play the same role as the network based (centralized) server 22, described in the above paragraph. Especially in case of Bluetooth, WLAN and infra red the cellular network server may detect two or more devices with matching preference profiles in one network cell and can offer the players to start a game e.g. via Bluetooth or the like. Another possible application resides in a local scenario wherein one of the terminal devices acts as a game server. It is also possible that the device suggests playing a certain game in a local scenario when the device has found a substantially matching profile (e.g. for a game) in the other device.

Figure 2:
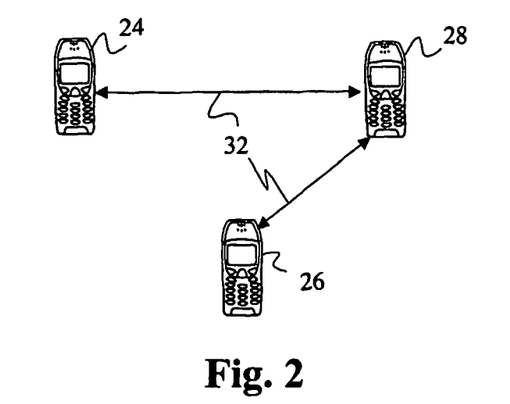
FIG. 2 shows a possible state or a distributes game application.

FIG. 2 shows a possible state of a distributed game, after the mediating server (not depicted in FIG. 2) has sent messages to each of said terminal devices 24, 26, 26. The message comprised the cellular communication addresses (e.g. the telephone numbers) to set up a direct connection between the players to play a game. The server has selected the players according to the number of required players (i.e. tree), the preferred time period of playing and the estimated gaming strength, coded in the preference data. The scat game is also played with a star topology that comprises a number of terminal devices 24, 26, and 26 being interconnected, wherein the terminal 28 represents the game server. According to different embodiments this topology can also be embodied as a number of game-enabled phone devices being interconnected 32 via telephone or short-range radio. As one of the alternatives to the star topology an interwoven structure is also possible, which is characterized by a distributed game program exchanging only the moves between the single interface devices. So there may be an additional connection between the terminals 24 and 26. It is also possible to build up (one-way) ring structures.

All the described topologies have in common, that a multiplayer game requires a minimum of required players to be started. The present invention provides a method to bring together player (that do not know each other) who want to participate in an online game.

In FIG. 2 the mediating server 22 is no longer depicted as it is not longer necessary when the game has already been started. It is to be noted that the invention may be reduced to a mediation of the participation in an online game. More sophisticated approaches of a game server may incorporate the mediation server within a game server.

Figure 3:
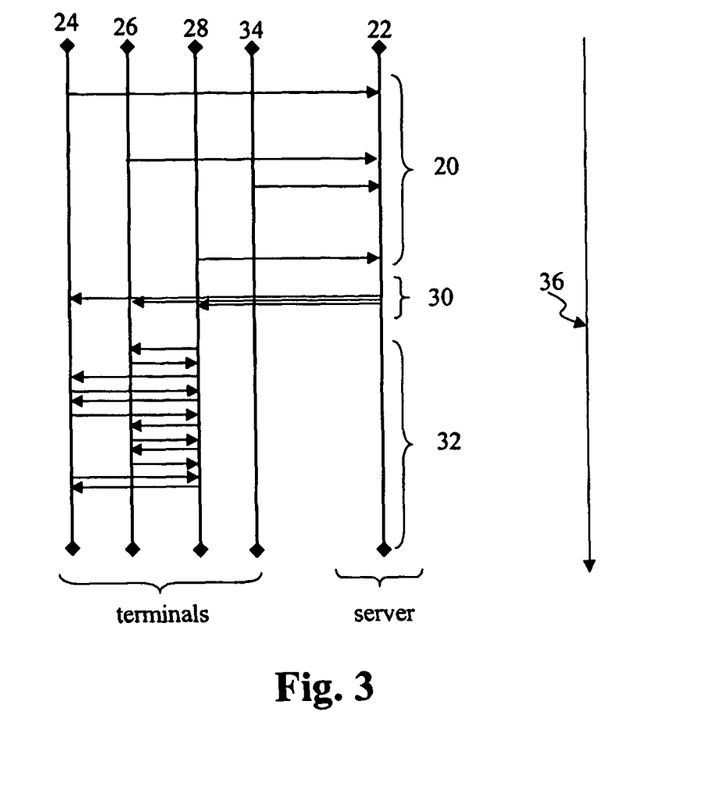
FIG. 3 represents a signal flowchart for according to one embodiment of the present invention.

FIG. 3 represents a signal flowchart according to one embodiment of the present invention. In the figure, the vertical lines 22, 24, 26, 28 and 34 represent different devices. The line 36 represents the time-axis. The users enroll themselves at the mediation server 22 during the section marked with the reference numeral 20 and declare or transmit their preference data (and ID data) to the server 22.

So the example in the figures deal with multiplayer online gaming. Cellular network multiplayer gaming requires basically three items. Games themselves are the most important. Game servers offer the possibility to run multiplayer games (may be integrated in on or off the user terminals). The other players are needed as well.

The invention intends to help individual players to find each other. There may very easily be situations where a potential multiplayer does not end up having multiplayer game simply because there are currently no available players registered to the server. This might be a problem especially if the game servers are run by fragmented market and every participant can register only to a specific server. Another issue is that especially in the beginning, when the biggest boost is needed, there will not be too many players who have capable devices or the games.

It is assumed that the users or CNG-players usually do not know other potential CNG-players. Therefor, one object of the present invention resides in that a server 22 should know which persons are interested in playing and what their preferences for playing are. It is assumed that the users of the terminal devices 24 26 and 28 want to play scat and have basically matching preference data. It is also assumed that the user of the terminal devices 34 wants to play a multi player adventure game.

According to the invention participants for an online game session send their gaming intention and wanted game to a server and the server saves this information in a database. This may be performed e.g. via a direct WAP connection to the mediating server 22.

Scat, as a game requires three players. After the user/terminal 24 has enrolled its data to the server 22 the server just stores these data (assuming that no other scat players are already enrolled). The invention suggests that players can register themselves to the servers. There are different parameters defined by the player, for example when he wants to play, what game he wants to play, which level of difficulty, which method of connection etc. The server or the game may prescribe the method of connection. The method of connection may also be defined in the device as a user preference.

The next user enrolling himself at the server is user terminal 24, also a user wanting to play scat with matching preferences. Scat as game requires three players, and therefore the critical number of players for starting the game has not yet been reached. The server may inform the terminal devices 24 and 26 via a notification that the probability that a game may soon be started as the number of players has increased, and only one additional player is required.

A user 34 enrolls himself with the preferences to play a multiplayer adventure game. It may be expected that no matching preferences can be found and the data of 24 are stored in the server. The preferences received from 34 are not matching with the preferences received form the terminals of 24 and 26. Thus no extra action may b performed. It is also possible that the server sends a notification to the phone of user 34 suggesting him to play scat instead of waiting, as there are two (potential) scat players waiting for the "third man". It is further assumed that user 34 is not interested in scat. Subsequently the server 22 waits for another enrolling player.

The next user enrolling is player 28 transferring matching preferences for playing scat. The server checks the preference data and determines that the number of players with matching preferences is high enough to start a game.

Then the server does perform the matching operation between different players and sends a connection request to the players if they would like to have a game. Subsequently the server sends notifications 30 to each of the terminals 24, 26, 28 to notify them that a group of enough players to start a game has been found. In the depicted example the notifications further comprise at least one address of one of the other players, so a user can set up a connection to start the game by sending e.g. an notification such as an SMS to one of the other players.

If all players want to start a game, they can contact each other to start playing the game via a wireless network such as a cellular telephone network.

The notifications can also be regarded as an invitation to participate in a game. Similarly the invitation can comprise an "admission ticket" in form of an entrance code an entrance script or the like that may grant access to a dedicated game server. If all the invited players accept the invitation the game or the competition can start.

When another player with the same game interest is found the players are informed, e.g. via SMS, and the game can be started by the players or through the server. When other player with the same game interest is found the players are e.g. informed by MMS and the game can be started automatically by confirmation of the players through the server.

In the depicted terminal based version the CNG software is located and operated at and by the terminals. The CNG software can be located e.g. in an MMC (Multi Media Card) inserted in the mobile terminal. The CNG software may be downloaded from a server to said terminal or to an MMC card inserted in the mobile terminal. The server is not longer needed and therefore, the terminals 24, 26, 28 may only communicate with each other.

It is also possible that terminals 24, 26, 28 play a server-based version (not depicted) wherein the CNG software is located and operated at and by a server. In this case the server is needed and therefore, the terminals 24, 26, 28 communicate with the server instead with each other.

Figure 4:
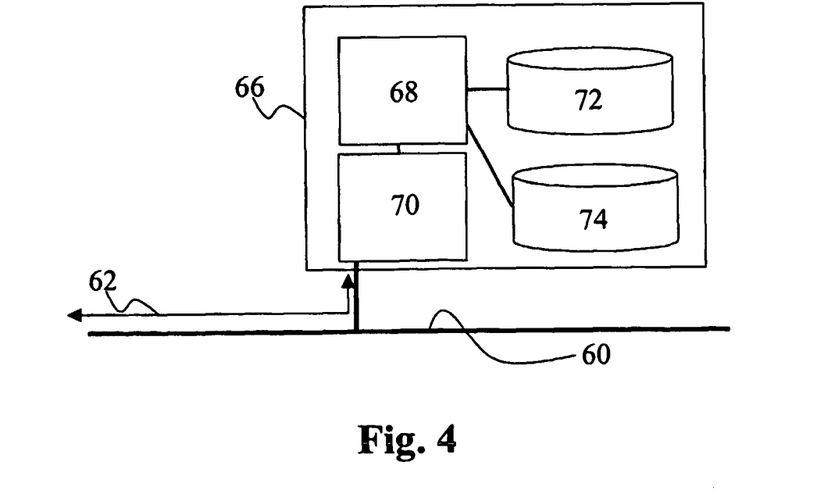
FIG. 4 depicts an implementation of a network server for enabling access to a multiple access online application such as an online game.

FIG. 4 depicts an implementation of a network server for enabling access to a multiple access online application such as an online game. Within the server 66 there is provided a database of players 72, 74. The players would enter 62 the data via their mobile, e.g. using WAP services. The players could enter the data via their mobile, e.g. using SMS or MMS services. The messages or data of the users (comprising the user IDs and preference data) are received via a communication network 60 e.g. the hard wired part of a cellular telephone communication network via a modem or a network interface 70.

The processor 68 stores the received data in a database. The database of players may be divided into a player ID database 72 and a preferences database 74. A processor 68 of the server 66 takes care of the databases 72 and 74, and matches are searched when appropriate. The matches may only be searched for in the preference database 74. When a substantial match is found a notification e.g. in form of an SMS or an MMS will be sent to the registered participants. The notifications or messages can comprise an information that a game can possibly be started under the conditions entered to the preferences database and that the player can join or start the game if suitable. The algorithm for matching the gamers or their preferences is not described in detail here. The algorithm for matching the gamers probably would have to include for 2 player games few more candidates before actually sending the request because people are not necessarily available even if they have entered such a data into database.

This problem has existed to some extend in the internet-world, but here the case is a bit different. Typically the servers are huge, so there is really a lot of possible players. And if for some reason there are not enough participants, then the game simply can not be started.

There has not been an earlier solution in this field of wireless communication networks or in the case of cellular telephone communication networks. The Internet world is different as the people are connected or disconnect. In cellular networks people are estimated to always being connected and always being connectable. The advantage is that developers of networks, terminal devices or games need not to take any special actions because of this. The implementation lies on the server. The advantage is that multiplayer games get easier to participate and organize. This enables a better acceptance to online games and revenues related to gaming.

An element of the invention resides in the fact that there is a way to register player into a mediating or a game server, and that the server is able to send notifications based on data in the database.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. A method comprising:
   receiving, in a mobile terminal device related to a user, a preference profile including identification data and preference data related to at least another user, from a mobile terminal related to said at least one other user;
   saving said received identification data and said received preference data in a user database within the mobile terminal device related to said user, said user database containing preference data of at least a third other user;
   comparing, in the mobile terminal device related to said user which received the preference profile, said received preference data with the preference data contained in the user database for determining users of substantially matching preference data, wherein the comparison is based on a user-defined degree of non-matching preference data included in preference data related to the user;
   determining, in the mobile terminal device related to said user which received the preference profile, a plurality of users having said substantially matching preference data; and
   sending a notification, from the mobile terminal device related to said user which received the preference profile, to each of said mobile terminals related to said determined users.

2. Method according to claim 1, further comprising granting to each of said notified users an access to a multiple access online application.

3. A method comprising:
   sending a preference profile including identification data and preference data of a user to a server connected to a wireless communication network, via said network, wherein the server is a mobile terminal device with access to a multiple access online application and related to another user;
   receiving, in the server mobile terminal device, the preference profile from a mobile terminal related to the user;
   saving said received identification data and said received preference data in a user database within the server mobile terminal device, said user database containing preference data of at least a third other user;
   comparing, in the server mobile terminal device, said received preference data with the preference data contained in the user database for determining users of substantially matching preference data, wherein the comparison is based on a user-defined degree of non-matching preference data included in preference data related to the another user;
   determining, in the server mobile terminal device, a plurality of users having said substantially matching preference data to the user;
   sending a notification, from the server mobile terminal device, to each of the mobile terminals related to said determined users; and
   receiving the notification from said server mobile terminal device in the mobile terminal related to the user, said notification comprising an offer to get access to said multiple access online application according to said preference data, wherein said notification comprises data to enable an access of the user to said multiple access online application.

4. Method according to claim 1, wherein said wireless communication network is a cellular telephone network.

5. Method according to claim 1, wherein said notification is a short message or a multimedia message.

6. Method according to claim 1, wherein said multiple access online application is a wireless communication network game.

7. A computer-readable storage medium storing a computer program and when said computer program is run on a mobile terminal device related to a user, the mobile terminal device:
   receives a preference profile including identification data and preference data related to at least one other user, from a mobile terminal related to said at least one other user;
   saves said received identification data and said received preference data in a user database within the mobile terminal device related to the user, said user database containing preference data of at least a third other user;
   compares said received preference data with the preference data contained in the user database of the mobile terminal device related to the user for determining users of substantially matching preference data, wherein the comparison is based on a user-defined degree of non-matching preference data included in preference data related to the user;
   determines a plurality of users having said substantially matching preference data; and
   sends a notification to each of said mobile terminals related to said determined users.

8. A device comprising:
   an interface, within said device, to a wireless communication network for exchanging data with at least one server connected to said wireless communication network wherein the server is a second mobile device related to another user and has access to a multiple access online application;
   a database within said device to store identification data and preference data of a user of said device; and
   a processor within said device and connected to said interface and said database
   and configured to send a preference profile including identification data and preference data of said user via said interface and via said network to a server,
   and configured to receive a notification from said server, said notification comprising an offer to get access to said multiple access online application according to said preference data, wherein said notification comprises data to enable an access of said user to said multiple access online application.

9. A device according to claim 8, wherein said processor is further configured to access a multiple access online application via a wireless communication network, in accordance with said received data to enable said access of said multiple access online application.

10. A device according to claim 8, further comprising an interface for connecting an exchangeable memory device.

11. A terminal related to a user and operating as a server comprising:
   an interface, within said terminal, to a wireless communication network for exchanging data with terminal devices connected to a wireless communication network,
   a database within said terminal for storing data received from said terminal devices,
   a processor within said terminal, said processor being connected to said interface and said database to process data, wherein said interface is adapted to receive a preference profile including identification data and preference data from at least one other mobile terminal, and said database is adapted to store said preference profile,
   means, within said terminal, for comparing said received preference data with preference data of at least a third other user for determining users of substantially matching preference data, wherein the comparison is based on a user-defined degree of non-matching preference data included in preference data related to a user of the mobile terminal, and
   means, within said terminal, for sending a notification to each of said mobile terminals related to said determined users.

12. A terminal according to claim 11 wherein said processor is configured to send said notification as a short message or as a multimedia message.

13. A system comprising:
   a wireless communication network;
   a server mobile terminal related to a user having access to a multiple access online application and connected to a wireless communication network configured to receive identification and preference data for other users of respective mobile terminal devices in preference profiles, compare the received preference profiles with stored preference profiles to determine users of substantially matching preference data based on a user-defined degree of non-matching preference data included in preference data related to the user, and send a notification to each of the users determined to have substantially matching preference data, the steps of receiving identification and preference data, comparing, and sending occurring within the server mobile terminal; and
   a plurality of mobile terminal devices each storing identification and preference data for a respective user of each of the plurality of mobile terminal devices in a preference profile, each device configured to transmit a respective preference profile to the server mobile terminal and receive a notification from the server mobile terminal via the wireless communication network wherein the notification includes an offer to get access to the multiple access online application according to the preference data and data to enable the respective users to access the multiple access online application.

* * * * *